(12) United States Patent
Nummila-Pakarinen et al.

(10) Patent No.: US 6,552,150 B1
(45) Date of Patent: Apr. 22, 2003

(54) POLYMER FILMS AND A PROCESS FOR THE PRODUCTION THEREOF

(75) Inventors: Auli Nummila-Pakarinen, Porvoo (FI); Ole Jan Myhre, Pregarten (AT); Bjarne Jansen, Porsgrunn (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/601,366

(22) PCT Filed: Feb. 10, 1999

(86) PCT No.: PCT/FI99/00101

§ 371 (c)(1), (2), (4) Date: Sep. 14, 2000

(87) PCT Pub. No.: WO99/41310

PCT Pub. Date: Aug. 19, 1999

(30) Foreign Application Priority Data

Feb. 10, 1998 (FI) .................................................. 980308

(51) Int. Cl.$^7$ ................................................. C08F 10/02
(52) U.S. Cl. ........................ 526/352; 526/64; 526/65; 526/348.1; 526/348.2; 526/348.3; 526/348.4; 526/348.5; 526/348.6; 525/52; 525/53; 525/319
(58) Field of Search ........................ 526/64, 65, 348.1, 526/348.2, 348.3, 348.4, 348.5, 348.6, 352; 525/53, 319, 52

(56) References Cited

U.S. PATENT DOCUMENTS 5,494,965 A * 2/1996 Harlin et al. ............ 525/240 X
5,684,097 A * 11/1997 Palmroos et al. ......... 526/65 X

FOREIGN PATENT DOCUMENTS

| EP | A1100843 | 2/1984 |
| EP | A1503791 | 9/1992 |
| EP | A1691353 | 1/1996 |
| WO | A1-9703124 | 1/1997 |
| WO | A1-9727225 | 7/1997 |

* cited by examiner

Primary Examiner—Fred Teskin
(74) Attorney, Agent, or Firm—Birch, Stewart, Kolasch & Birch, LLP

(57) ABSTRACT

The present invention concerns a polyethylene composition particularly suitable for film blowing. The invention also concerns a process for the production thereof. The composition comprises a low molecular weight portion having a density of more than 960 kg/m$^3$ and a high molecular weight portion. The polyethylene composition has a density of about 925–940 kg/m$^3$ and a melt flow rate in the range of MFR$_{21}$, from 5 to 40 g/10 min. A polyethylene film blown from the polyethylene composition exhibits a tensile strength at yield in transverse direction at least 15 MPa, a 1% secant modulus in machine direction at least 300 MPa and in transverse direction at least 400 MPa, and a dart drop of at least 5 g/$\mu$m.

11 Claims, 3 Drawing Sheets

POLYMER FILMS AND A PROCESS FOR THE PRODUCTION THEREOF

BACKGROUND OF THE INVENTION

1. Field of the Invention

The present invention relates to polymer films. In particular, the present invention relates to medium density polyethylene compositions and polymer films blown from such polyethylene compositions and having improved impact and excellent mechanical properties and good processability. The invention also concerns a process for the production of the polymer compositions.

2. Description of Related Art

There is a growing demand for thinner films (downgauging) due to environmental aspects and cost reduction. Since film strength and performance in packaging lines should be maintained in spite of the downgauging, stiffer films with high mechanical properties are needed to meet future demands.

The polyolefin materials used for blown film applications can be divided into the following five groups of materials:

1) Low Density Polyethylene (LDPE) having broad molecular weight distribution (MWD) and produced by radical polymerisation in one reactor;
2) Linear Low Density Polyethylene (LLDPE) having narrow MWD and produced by polymerization in the presence of Ziegler catalysts in one reactor
3) High Density/Medium Density Polyethylene (HD/MDPE) having broad MWD and produced by polymerization in the presence of Cr catalysts in one reactor
4) High Density Polyethylene (HDPE) having a bimodal (broad) MWD) and produced by polymerization in the presence of Ziegler catalysts in two reactors in series (cascade)
5) Linear Low Density Polyethylene (LLDPE) having a bimodal (broad) MWD and produced by polymerization in the presence of Ziegler catalysts in two cascaded reactors.

The market for PE films is continuously developing improved solutions to packaging requests based on the above type of materials.

Unimodal LLD materials (point 2 above) used in film application, typically having density lower than 926 kg/m$^3$, exhibit good mechanical properties (such as tear strength or dart drop). There are applications, however, where their stiffness is not high enough. In those applications materials with higher density are used. When the density has been increased to increase the stiffness, the mechanical properties have suffered in the trade-off.

Bimodal LLD film materials (point 5 above) have a superior balance between mechanical properties and stiffness, as well as a superior processability compared to a unimodal LLD. This type of material has been described e.g. in a Finnish Patent Application No. 945926. Some other bimodal LLDPE-type materials are disclosed in EP Patent Applications Nos. 0 492 656, 0 691 367, 0 773 257 and 0 773 258.

However, there are applications where an even higher stiffness is required. There are bimodal high density film materials available (point 4 above) with a high stiffness. This kind of material is discussed e.g. in EP Patent Application No. 0 691 353. Unfortunately, a reduction in the mechanical properties is then observed.

One problem associated with the bimodal (or multimodal) polyethylenes is the inherent heterogeneity of the material, due to the fact that it consists of components having very different molecular weights (or melt flow rates) and comonomer contents (or densities, or degrees of branching). The problem associated with the differences in molecular weight is discussed e.g. in an article by Böhm, Enderle and Fleissner (Industrial Synthesis of Bimodal Polyethylene Grades with Improved Properties), where it is stated (on page 355) that problems are to be expected when polymers having a ratio between their molecular weights higher than 10 are mechanically blended. The problems associated with the different degree of branching (or different density) are studied by Morgan, Hill, Barham and Frye in a recent article (Liquid-Liquid Phase Separation in Ternary Blends of Linear Polyethylene with Two Ethylene Butylene Copolymers, Polymer, Vol. 38, No. 8, pp. 1903–1909, 1997). The authors show that phase separation may occur when linear PE is blended with an ethylene-butene copolymer (e.g. FIG. 1 and FIG. 4) having a relatively low degree of branching. It is also stated in article by Alamo, Kim, Mandelkem, Galante, Wignall, Londono and Stehling (The Cocrystallization of Mixtures of Homopolymers and Copolymers: Polyolefins, Polym. Mater. Sci. Eng., Vol. 78, pp. 213–214, 1998, page 213) that when linear PE is blended with branched PE having a branch concentration higher than 8 mol-%, phase separation in the melt occurs.

The consumption of MDPE for blown film is increasing and the market is typically supplied by unimodal Cr-based products. These materials are extensively used in coextruded films for stiffness-improvement, but give a relatively small contribution to other physical properties like impact required by the packaging. The processability on a film blowing line as well as the physical properties of the final film are very much dependent on the polymer structure, especially MWD and SCBD.

Thus, as apparent from the above, the available materials for film blowing give limited alternatives in terms of a balance between stiffness and other mechanical properties.

SUMMARY OF THE INVENTION

It is an object of the present invention to eliminate the problems of the prior art and to provide novel blown polymer films.

It is another object of the present invention to provide a process for producing suitable polyethylene materials for production of films, in particular blown films.

These and other objects, together with the advantages thereof over known processes and products, which shall become apparent from the specification which follows, are accomplished by the invention as hereinafter described and claimed.

As mentioned above, the general belief in the art has been that if increased stiffness is sought, then some of the mechanical properties have to be sacrified by increasing the density of the material. However, contrary to this belief, it has now surprisingly been found that if the material with the higher density is bimodal and the increase of the density is made in a specific way, the mechanical properties remain unaffected while the stiffness is increased. The outcome is a material with mechanical properties equal to those of the LLD but with improved stiffness.

In particular, the present material comprises a bimodal medium density polyethylene with i. 30 to 50 % by weight, preferably 35–45 %, and in particular 37–43 %, of a low molecular weight portion having a density of at least 960 kg/m$^3$ and an MFR$_2$>100g/10 min and a low comonomer content and ii. 70 to 50% by weight, preferably 65 to 55%, and in particular 63–57%, of a high molecular weight portion having a density calculated to be in the range of 890 to 920 kg/m$^3$ and a high comonomer content, the present polyethylene having a density of about 920–945 kg/tm$^3$, in particular 925–940 kg/m$^3$, and a melt flow rate in the range of MFR$_{21}$ 5 to 50 g/10 min. The comonomer content of the high molecular weight portion is at least about twice higher, preferably at least about 3 times higher than in the low molecular weight portion.

The present bimodal MDPE material has an elongational viscosity which increases with increasing elongation rate. Therefore, it is particularly well suited for the production of blown films. The films according to the present invention exhibit, depending on density and MFR of the composition and on the film blowing conditions, a tensile strength in transverse direction of 15 MPa or more, and a 1% secant modulus in machine direction of at least 300 MPa and in transverse direction of 400 MPa or more.

The present compositions are preferably produced by polymerizing or copolymerizing ethylene in a reactor cascade formed by at least two reactors operated with different amounts of hydrogen and comonomers to produce a high molecular weight portion in one of the reactors and a low molecular weight portion in another.

The blown films exhibit a tensile strength in transverse direction of at least 15 MPa; 1% secant modulus in machine direction of at least 300 MPa and in transverse direction of at B least 400 MPa; and, when run to a film having a thickness between 35–45 μm in a machine operating with a low neck, a dart drop of at least 5 g/μm.

The process of producing a blown polyethylene film according to the present invention comprises the steps of producing a polyethylene composition in the presence of a catalytic system of an ethylene polymerizing catalyst and cocatalyst in a multistage reaction sequence consisting of successive polymerization stages where at least one stage is carried out in a gas phase by subjecting ethylene, optionally hydrogen and comonomers to a first polymerization or copolymerization reaction in a first reaction zone or reactor to produce a first polymer; recovering the first polymer and the catalyst therein from the first reaction zone; feeding the first polymer into a second polymerization zone or reactor; feeding additional ethylene and optionally hydrogen and comonomers to the second reaction Zone; subjecting the additional ethylene and optionally additional monomer(s) and hydrogen to a second polymerization reaction in the presence of the first polymer and the catalyst therein to produce a second polymerization product having an MFR$_{21}$ of less than 50 g/10 min; and recovering the combined polymerization product from the second reaction zone, and blowing the thus obtained polyethylene composition into a film.

Considerable advantages are obtained by means of the present invention. Thus, the present invention provides a product having improved tear resistance as well as excellent film homogenity, compared to conventional Cr based materials at the same stiffness levels. Further, the product has an improved stiffness/impact balance and higher stiffness, allowing for downgauging and increased downstream converting speeds.

The novel MDPE material is particularly suitable for film blowing, with an improved processability allowing it to be run on a variety of film lines (LD, LLD and HD lines) and coextrusion film lines.

Next, the invention will be more closely examined with the aid of the following detailed description and with reference to the attached drawings.

DETAILED DESCRIPTION OF THE INVENTION

Definitions

Figure 1:
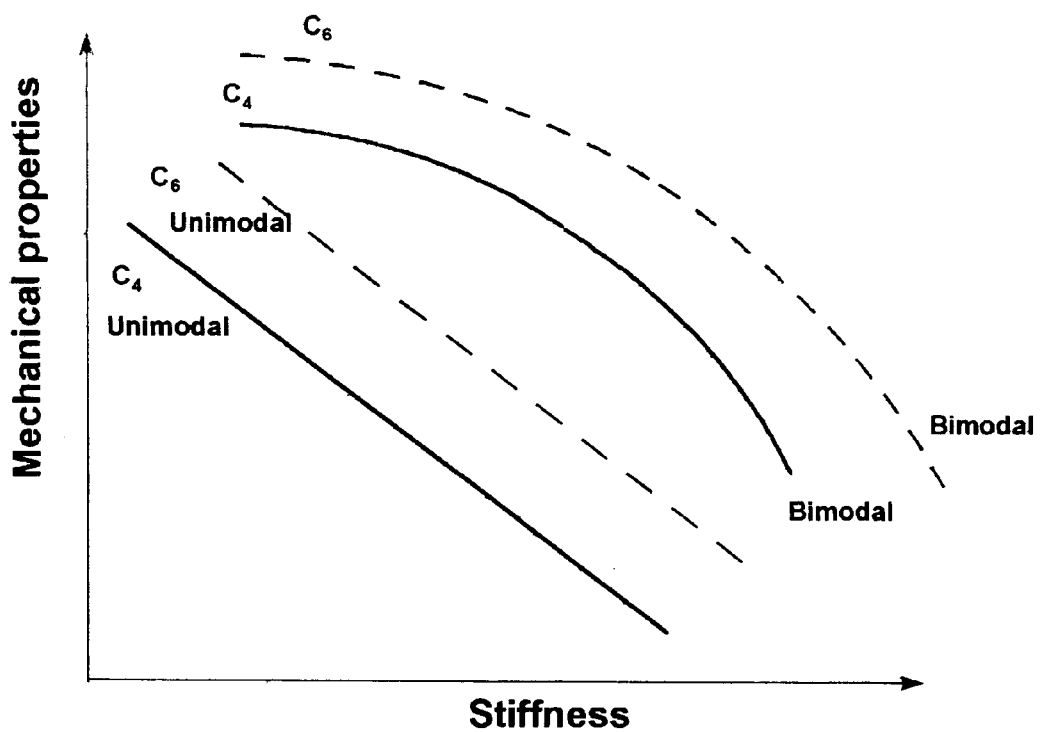
FIG. 1 shows the relationship between stiffness and mechanical properties for films blown from unimodal and bimodal polymer composition comprising 1-butene and 1-hexene, respectively, as comonomers.

For the purpose of the present invention, "slurry reactor" designates any reactor, such as a continuous or simple batch stirred tank reactor or loop reactor, operating in slurry and in which the polymer forms in particulate form. According to a preferred embodiment the slurry reactor comprises a loop reactor.

By "gas phase reactor" is meant any mechanically mixed or fluid bed reactor. Preferably the gas phase reactor comprises a mechanically agitated fluid bed reactor with gas velocities of at least 0.2 m/sec.

By "Melt Flow Rate" or abbreviated "MFR" is meant the weight of a polymer extruded through a standard cylindrical die at a standard temperature in a laboratory rheometer carrying a standard piston and load. MFR is a measure of the melt viscosity of a polymer and hence also of its molar mass. The abbreviation "MFR" is generally provided with a numerical subindex indicating the load of the piston in the test. Thus, e.g., MFR$_2$ designates a 2.16 kg load and MFR$_{21}$, a load of 21.6 kg. MFR can be determined using, e.g., by one of the following tests: ISO 1133 C4, ASTM D 1238 and DIN 53735.

By "Flow Rate Ratio" or abbreviated FRR is meant a ratio between two MFR values measured from the same polymer using different loads. The abbreviation FRR is generally provided with a subindex indicating which loads have been used to determine the FRR. Thus FRR$_{21/5}$, has been obtained as a ratio of MFR$_{21}$ to MFR$_5$. The FRR is a measure of the broadness of the MWD. A high FRR corresponds to a broad MWD.

Linear polyethylene is blown into a film in two types of machines. Typically, linear low density PE is processed in machines operating in so-called 'low neck' conditions, which means that a relatively low blow-up ratio and a relatively low frost line height has been employed during film blowing. Polymers that are typically run with a low neck have a relatively low molecular weight (with MFR$_2$ about 1). In the molten polymer zone between the die and the frost line relaxation of the polymer takes place.

On the other hand, high density PE is usually processed in machines with so-called 'high-neck' conditions, where a relatively high blow-up ratio and a relatively high frost line height have been employed. Polymers which typically run with a high neck have a relatively high molecular weight (with MFR$_{21}$, about 7). In the molten polymer zone between the die and the frost line some relaxation, but especially biaxial orentation of the polymer takes place. Typically, orientation increases the mechanical strength of the polymer in the direction of the orientation. This means that a mechanically stronger film is obtained in the 'high-neck' conditions, and e.g. dart drop is increased.

The polyethylenes known in the art (and which were listed on page 1 above) have been designed specifically for one of these applications. An outstanding feature of the present invention is its flexibility, which allows it to be used in both of these applications.

Table 2 (in the Example section) of this application shows an example of these methods of operation. There, a machine manufactured by Windmöller & Hölscher, having a 60 mm extruder and a 200 mm die with a 1.2 mm die gap was operated with a blow-up ratio of 3:1 and frost line height 650 mm. This is an example of the 'low neck' conditions. On the other hand, a machine manufactured by Alpine, having a 65 mm extruder and a 160 mm die with a 1.5 mm die gap was operated with a blow-up ratio of 4:1 land frost line height 1280 mm. This is an example of the 'high neck' conditions.

The Polymer Composition

The present invention concerns a medium density polyethylene composition having a bimodal molar mass distribution comprising a high molar mass portion and a low or medium molar mass portion. The high molar mass portion contains comonomers which improve the mechanical properties of the polymer. Surprisingly, this improvement is not linear. FIG. 1 shows the relationship between the stiffness and the mechanical properties of four different MDPE-type polymer compositions, two having a unimodal MWD and two having a bimodal MWD. As apparent from FIG. 1, the use of a higher olefin (1-hexene vs. 1-butene) improves the mechanical properties so that they remain on an acceptable level even if the stiffness is somewhat increased, for example by increasing the density of the polymer. As known in the art, the comonomers are usually accumulated in the low molar mass part of the polymer molecular weight distribution of a unimodal product. In contrast, for bimodal polymers, the comonomers are concentrated in the high molar mass portion. As a result, as also apparent from the FIG. 1, on the same stiffness level, comonomers will not only improve the mechanical properties in comparison to those of the corresponding unimodal polymer, they will also have a suspending effect on the declination of the mechanical properties when stiffness is increased. Thus, on a large range of high stiffness, the mechanical properties of bimodal medium density polyethylenes are significantly higher than those of the corresponding unimodal polymers. The bimodal polyethylene having 1-butene as a comonomer typically has superior mechanical properties compared to a unimodal material having 1-hexene as a comonomer.

Generally an amount of 0.1 to 10 % comonomers in the polymer composition is preferred, in particular the amount is about 2 to 8 wt-%.

According to one embodiment of the present invention, the polyethylene composition comprises (i) a low molecular weight portion having a density of more than 960 kg/m3 and an $MFR_2$ higher than 100 g/10 min (ii) a high molecular weight portion, the polyethylene composition having a density of about 925–940 kg/m3 and a melt flow rate in the range of from $MFR_{21}$=5 to $MFR_2$=15 g/10 min.

Preferably, the polyethylene composition above has a density of about 925–940 kg/m$^3$ and a melt flow rate in the range of $MFR_{21}$5 to 50 g/10 min.

Further, the polyethylene composition described above comprises preferably 30 to 50% by weight, preferably 35–45 %, and in particular 37–43 %, of a low molecular weight portion having a density of at least 960 kg/m$^3$ and an $MFR_2$>100 g/10 min and a low comonomer content; and 70 to 50% by weight, preferably 65 to 55%, and in particular 63–57%, of a high molecular weight portion having a density calculated to be in the range of 890 to 920 kg/m$^3$ and a high comonomer content.

The medium density polyethylene according to the invention comprises 70 to 50% of a high molar mass portion, and 30 to 50 of a low molar mass portion and the Melt Flow Rate of the polymer is in the range from about $MFR_2$, 5 to $MFR_2$15 g/10 min, preferably in the range from about $MFR_{21}$, 5 to 40 g/10 min. The composition contains about 2 to 8% comonomers, and the low molar mass portion contains less than 1% comonomers. The density of the polymer product is about 920 to 945 kg/m$^3$, in particular about 925–940 kg/m$^3$. The charpy impact strength at −20° C. is generally higher than 90 kJ/m$^2$, and the Flow Rate Ratio FRR21/5 higher than 20.

As specific examples of preferred embodiments, the following bimodal Z-N based MDPE polymers for film blowing can be mentioned:

A MDPE having a $MFR_2$, of 20 g10 min and a density of 931 kg/m$^3$,

A MDPE having a $MFR_2$, of 13 g/10 min, a density of 937 kg/m$^3$.

Figure 2:
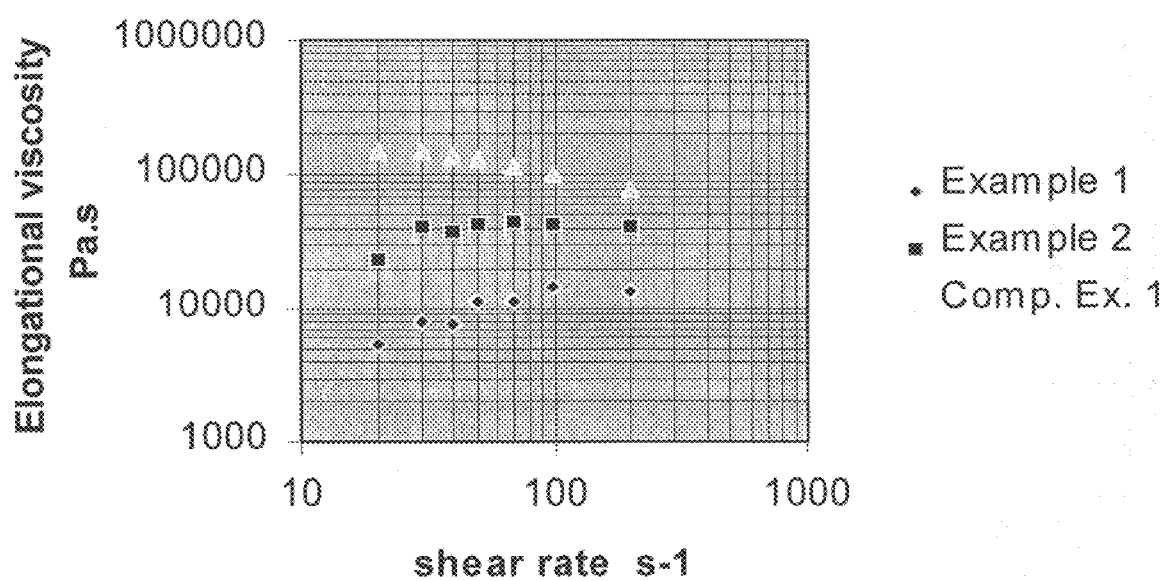
FIG. 2 Chows elongational viscosity according to Cogswell method plotted vs. equivalent shear rate in die for two samples prepared from the present polyethylene composition compared with a reference sample.
Figure 3:
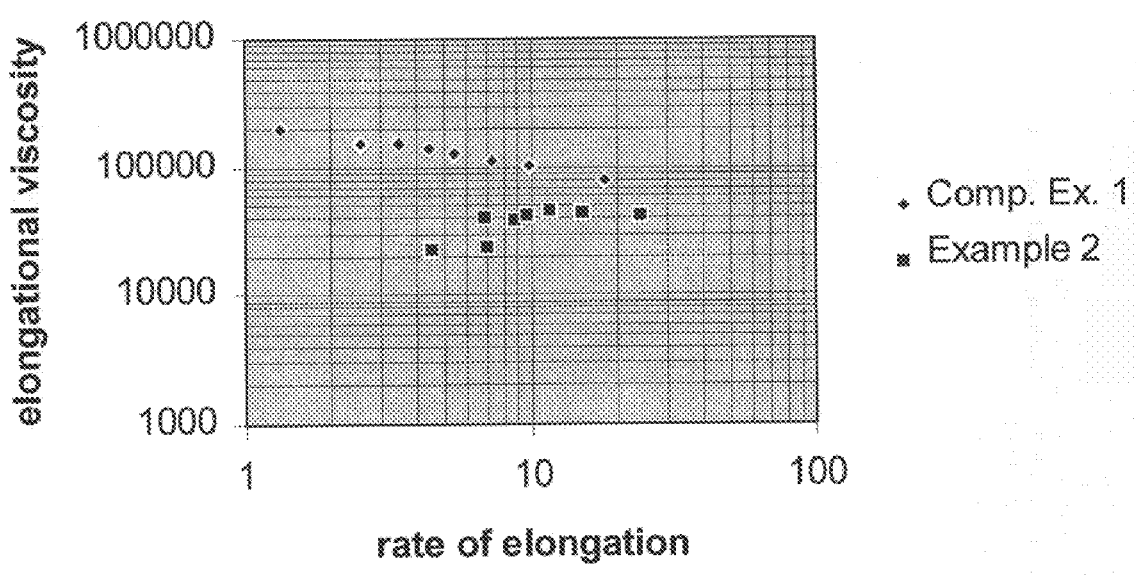
FIG. 3 shows the elongational viscosity according to Cogswell method vs. elongation rate for one sample prepared from the present polyethylene composition compared with a reference sample.

Surprisingly it has been found, that a composition according to the invention exhibits strain hardening, i.e. its elongational viscosity increases with increasing elongation rate. This feature is opposite to the behaviour of unimodal materials prepared using chromium catalysts, which exhibit strain thinning, where the elongational viscosity decreases with increasing elongation rate. This is presented in FIGS. 2 and 3, which show the elongational viscosities of the material according to the invention and a prior art material as functions of shear rate and elongation rate respectively.

This difference has a significant consequence e.g. in film blowing. In practice, it is not possible to maintain an exactly constant material feed and operating conditions in a film line. If the material feed to the die decreases, the elongation rate shall increase. If the material has a strain thinning behaviour, its elongational viscosity decreases. This results in that the material has less resistance to extension and consequently variations in the film thickness occur. However, if the material exhibits strain hardening, its elongational viscosity increases with increasing elongation rate. The increased viscosity resists the elongation and thus a more even film thickness is obtained.

Due to excellent mechanical properties in combination with sufficient stiffness and excellent processability, the present polyethylene compositions are remarkably well suited for film blowing. The films will have a homogeneous appearance and generally exhibit following features:

A. If the composition has a density between 929–934 and $MFR_2$, between 12–30 g/10 min the film is generally blown using 'low neck' conditions and the resulting film has following properties:

tensile strength in transverse direction of at least 15 MPa;

1% secant modulus in machine direction of at least 300 MHa and in transverse direction of at least 400 MPa; and when run to a film having a thickness between 35–45 μm, the film has a dart drop of at least 5 g/μm.

B. On the other hand, if the composition has a density between 935–939 and $MFR_{21}$, between 7–20 g/10 min, the film may be blown using low neck and then the film has following properties:

tensile strength in transverse direction of at least 20 MPa;

1% secant modulus in machine direction of at least 400 MPa and in transverse direction of at least 500 MPa; and when run to a film having a thickness between 35–45 μm, the film has a dart drop of at least 5 g/μm.

C. The film may also be blown using high neck and then the resulting film has following properties:

tensile strength in transverse direction of at least 20 MPa;

1% secant modulus in machine direction of at least 400 MPa and in transverse direction of at least 500 MPa; and when run to a film having a thickness between 20–30 μm, the film has a dart drop of at least 8 g/μm.

Polymerization Process

To produce the polymer compositions, ethylene is polymerized in the presence of a suitable catalyst, preferably a Ziegler-Natta catalyst (cf. below), at an elevated temperature and pressure. Polymerization is carried out in a series of polymerization reactors selected from the group of slurry and gas phase reactors. A loop reactor is a particularly preferred embodiment of polymerization in slurry reactors. The high molar mass portion and the low or medium molar mass portion of the product can be prepared in any order in the reactors.

As disclosed above, preferably a Ziegler-Natta catalyst is used to produce the composition. Such a catalyst comprises an active compound, which generally is compound of a transition metal of groups 4–5 in the Periodic Table of Elements (TUPAC, 1990). Typically, the active compound is a halogen containing compound of Ti, V or Zr. Often the catalyst also contains compounds of other metals, like halogen-containing compounds of Mg and/or Al.

The catalyst may be unsupported or it may be supported on any particulate support known in the art. Typically the support material is an oxide of an inorganic element, like silicon, aluminum, titanium or aluminium. It may also be a mixed oxide of the abovementioned elements. However, organic supports, which usually are organic polymers, may also be used. Thus, the support may be silica, alumina, zirconia, silica-alumina, silica-titania, silica-zirconia, polystyrene etc.

An example of a suitable unsupported catalyst is shown e.g. in EP-B-491566. Examples of suitable supported catalyst are given in e.g. EP-B-688794 or EP-B-604850. An especially suitable catalyst is the one prepared according to EP-B-688794, since that catalyst is capable of producing ethylene (co)polymers in high yields both at high and low hydrogen concentration. This is a beneficial feature when producing a composition according to the invention, wherein one polymerization step is performed at high hydrogen concentration and one polymerization step is performed at low hydrogen concentration.

The catalyst is used together with a cocatalyst, which generally is an alkyl containing compound of a metal of groups 2 or 13, typically an aluminum alkyl, like triethylaluminum.

The compositions according to the invention can advantageously be produced in a multistage polymerisation process comprising two or more cascaded reactors. While it may be possible to use a process comprising cascaded slurry reactors only, such a process is not recommended, due to problems which may occur when a component having a low density is dissolved in the reaction diluent. Thus, it is recommended to use a process comprising at least one gas phase reactor. A process comprising a loop reactor and a gas phase reactor, according to a European patent Specification EP-B-517868 has been found to be especially beneficial to produce the composition. The process allows a stable continuous operation, which results in homogeneous and uniform product.

It should be also noted that the composition according to the invention can also be produced in a single reactor using a mixed catalyst, where one catalyst particle contains different kinds of active species. In this case, both the active species may be metallocene species, or one or both of them may be Ziegler species.

In the following the reactor system will be described with particular reference to a system akin to the one disclosed in EP Patent Specification No. 0 517 868 and comprising one loop reactor (referred to as "the first reactor") and one gas phase reactor (referred to as "the second reactor"), in that order. However, it should be understood that the reactor system can comprise the reactors in any number and order.

In every polymerization step it is possible to use also comonomers selected from the group of $C_{3-18}$ olefins, preferably $C_{4-10}$ olefins, such as 1-butene, 1-pentene, 1-hexene, 4-methyl-1-pentene, 1-heptene, 1-octene, 1-nonene and 1-decene as well as mixtures thereof. The use of comonomers is particularly preferred for the preparation of the high molar mass portion.

In addition to the actual polymerization reactors used for producing the bimodal ethylene homo- or copolymer, the polymerization reaction system can also include a number of additional reactors, such as prereactors. The prereactors include any reactor for prepolymerizing the catalyst and for modifying the olefinic feed, if necessary. All reactors of the reactor system are preferably arranged in series (in a cascade).

According to the invention, the polymerization comprises the steps of subjecting ethylene, optionally hydrogen and/or comonomers to a first polymerization reaction in a first reaction zone or reactor, recovering the first polymerization product from the first reaction zone, feeding the first polymerization product to a second reaction zone or reactor, feeding additional ethylene and optionally hydrogen and/or comonomers to the second reaction zone, subjecting the additional ethylene and optional hydrogen and/or comonomer to a second polymerization reaction in the presence of the first polymerization product to produce a second polymerization product, and recovering the second polymerization product from the second reaction zone.

Thus, in the first step of the process, ethylene with the optional comonomer(s) together with the catalyst is fed into the first polymerization reactor. Along with these components hydrogen as a molar mass regulator is fed into the reactor in the amount required for achieving the desired molar mass of the polymer. Alternatively, the feed of the first reactor can consist of the reaction mixture from a previous reactor, if any, together with added fresh monomer, optional hydrogen and/or comonomer and cocatalyst. In the presence of the catalyst, ethylene and the optional comonomer will polymerize and form a product in particulate form, i.e. polymer particles, which are suspended in the fluid circulated in the reactor.

The polymerization medium typically comprises the monomer (i.e. ethylene) and/or a hydrocarbon, and the fluid is either liquid or gaseous. In the case of a slurry reactor, in particular a loop reactor, the fluid is liquid and the suspension of polymer is circulated continuously through the slurry reactor, whereby more suspension of polymer in particle form in a hydrocarbon medium or monomer will be produced.

The conditions of the slurry reactor are selected so that at least 20 wt-%, preferably at least 35 wt-%, of the whole production is polymerized in the slurry reactor(s). The temperature is in the range of 40 to 110° C., preferably in the range of 70 to 100° C. The reaction pressure is in the range of 25 to 100 bar, preferably 35 to 80 bar. In order to produce a polyethylene having a density in excess of 960 kg/m$^3$, the polymerization is preferably carried out at supercritical conditions at temperatures over 90° C.

In slurry polymerization more than one reactor can be used in series. In such a case the polymer suspension in an inert hydrocarbon produced in the slurry reactor is fed without separation of inert components and monomers periodically or continuously to the following slurry reactor, which acts at lower pressure than the previous slurry reactor.

The polymerization heat is removed by cooling the reactor by a cooling jacket. The residence time in the slurry reactor must be at least 10 minutes, preferably 20–100 min for obtaining a sufficient degree of polymerization.

According to one embodiment of the invention light inert hydrocarbons are fed to the reactor. Examples of such hydrocarbons are propane, iso-butane, n-butane and isopentane. Preferably propane is used as the light, inert hydrocarbon.

As discussed above, if a low molar mass polyethylene is the desired product, hydrogen is fed into the reactor. Hydrogen can be added to the reactor at ratio of at least 100 mol H$_2$/kmol ethylene, preferably 300–600 mol H$_2$/kmol ethylene.

The pressure of the first polymerization product including the reaction medium is reduced after the first reaction zone in order to evaporate volatile components of the product, e.g. in a flash tank. As a result of the flashing, the product stream containing the polyethylene is freed from hydrogen and can be subjected to a second polymerization in the presence of additional ethylene to produce a high molar mass polymer.

In order to produce a polyethylene composition having a tensile strength at yield in transverse direction at least 15 NPa, a 1% secant modulus in machine direction at least 300 MPa and in transverse direction at least 400 MPa; and a dart drop at least 5 g/µm, ethylene, optionally hydrogen and comonomers are reacted in the first step to produce a polymer having a MFR, of 100 g/10 min or more.

The second reactor is preferably a gas phase reactor, wherein ethylene and preferably comonomers are polymerized in a gaseous reaction medium.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and propane and also hydrogen as a modifier. The fluidized gas phase reactor can be equipped with a mechanical mixer.

The gas phase reactor used can be operated in the temperature range of 50 to 115° C., preferably between 60 and 10° C. and the reaction pressure between 10 and 40 bar and the partial pressure of monomer between 1 and 20 bar.

In the second polymerization step, preferably a second polymerization product having an MFR$_{21}$, of less than 50 g/10 rain is produced.

The pressure of the second polymerization product including the gaseous reaction medium can then be released after the second reactor in order optionally to separate part of the gaseous and possible volatile components of the product, e.g. in a flash tank. The overhead stream or part of it is recirculated to the second reactor.

The production split between the high molar mass polymerization reactor and the low or medium molar mass polymerization reactor is 50–70: 50–30. Preferably, 35 to 45%, in particular 37 to 43%, of the ethylene homopolymer or copolymer is produced at conditions which provide a polymer having a MFR$_2$ of 100 g/10 min or more and constituting the low molar mass portion of the polymer, 65 to 55%, in particular 63 to 57%, of the ethylene homopolymer or preferably copolymer is produced at conditions which provide a polymer having a MFR$_{21}$, of less than 50 g/10 min, in particular about 5 to 50 g/10 min and constituting the high molar mass portion of the polymer. The density of the low molar mass portion is preferably over 960 kg/m$^3$ and the density of the final polymer is preferably 925 to 940 kg/m$^3$.

The present polymers and copolymers of ethylene can be blended and optionally compounded with additives and adjuvants conventionally used in the art. Thus, suitable additives include antistatic agents, flame retardants, light and heat stabilizers, pigments, processing aids and carbon black. Fillers such as chalk, talc and mica can also be used. The following non-limiting examples illustrate the invention:

DESCRIPTION OF ANALYTICAL METHODS

Charpy Impact Strength

Charpy impact strength is measured with ISO 179 method. The test specimen is supported as a horizontal simple beam and is broken by a single swing of a pendulum with the impact line midway between the supports and opposite the (eventual) notch.

Dart Drop

Dart drop is measured using ISO 7765-1 method. A dart with a 38 mm diameter hemispherical head is dropped from a height of 0.66 m onto a film clamped over a hole. If the specimen fails the weight of the dart is reduced and if it does not fail the weight is increased. At least 20 specimen need to be tested. A weight resulting failure of 50% of the specimen is calculated.

Tensile Strength at Yield

Tensile strength at yield is obtained from a tensile experiment. The experiment is performed according to ISO 1184 method. The specimen is emended along its major axis at a constant speed.

Secant Modulus

Secant modulus at 1% elongation is also obtained from a tensile test. The value is the ratio of stress to strain at 1% strain on the stress-strain curve.

Tear Strength

Tear strength is measured using ISO 6383 method. The force required to propagate tearing across a film specimen is measured using a pendulum device. The pendulum swings by gravity through an arc, tearing the specimen from a precut slit. The specimen is held on one side by the pendulum and on the other side by a stationary member. Tear strength is the force required to tear the specimen.

EXAMPLE 1

A loop reactor of a production scale plant was operated at 95° C. temperature and 60 bar pressure. Into the reactor was added ethylene, hydrogen, propane diluent and a polymerization catalyst prepared according to EP 688794 so that 50 tons/h of polyethylene having $MFR_2$ of 410 g/10 min and density 970 kg/m3 was formed. The polymer containing the active catalyst was separated from the reaction media and transferred to a gas phase reactor where additional ethylene, hydrogen and 1-butene comonomer were added so, that in total 12.5 tons/h polyethylene having $MFR_{21}$ of 20 g/1 min and density 930.5 kg/m3 was formed. The material was compounded with 2000 ppm per weight of polymer of Irganox B225 additive and 1500 ppm calcium stearate and pelletized. The fraction of the high MFR material (or low molecular weight material) in the total polymer was 40%. The 1-butene content of the polymer was analysed and found to be 6.4% by weight, or 3.3% by mole. Since the material produced in the loop reactor did not contain any comonomer, the comonomer content of the fraction produced in the gas phase reactor had to be 11% by weight or 5.8% by mole. The corresponding density was estimated to be 904 kg/m3.

EXAMPLE 2

A gas phase reactor was operated at 83 ° C. temperature and 25 bar pressure. Into the reactor was added ethylene, hydrogen, 1-hexene comonomer and a polymerization catalyst prepared according to EP 688794 so that 8 kg/h of polyethylene having $MFR_{21}$ of about 1 g/10 min and density 917 kg/m$^3$ was formed. The polymer containing the active catalyst was separated from the reaction media and transferred to another gas phase reactor where additional ethylene, hydrogen and 1-hexene comonomer were added so, that in total 13 kg/h polyethylene having $MFR_{21}$ of 13 g/10 min and density 937 kg/m3 was formed. The material was compounded with 2000 ppm per weight of polymer of Irganox B225 additive and 1500 ppm calcium stearate and pelletized. The fraction of the high MFR material (or low molecular weight material) in the total polymer was 39%. The density of the low molecular weight fraction was thus estimated to be 968 kg/m3.

EXAMPLE 3

Material prepared according to Example 1 was blown to, a film on a Windmöller & Höscher film line with 60 mm extruder, 200 mm die, 1.2 mm die gap and Blow-Up Ratio (BUR) 3 and Frost Line H eight (FLH) equaling to 3 die diameters (3 DD). The properties of the material and the film can be seen in the third column of Table 1.

Comparative Example 1

A commercially available unimodal material was blown to film. The film was blown on a 200 mm die, 1.4 mm die gap, BUR 2 and low FLH. (The data has been taken from a presentation of J. C. Dewart: Extended Medium Density Polyethylene Application Range with Metallocene Catalysed MDPE, Presentation was held in Eurofilm 97 conference in Frankfurt Jun. 3–5 1997, organised by Applied Market Information, Bristol, UK). The properties of the material and the film can be seen in the second column of Table 1.

Comparative Example 2

Another commercially available unimodal material was blown to film employing the conditions presented in Example 1. The properties of the material and the film can be seen in the first column of Table 1 and also in the first column of

TABLE 1

| MDPE type | Comparative Example 2 | Comparative Example 1 | Bimodal |
|---|---|---|---|
| $MFR_{21}$ [g/10 min] | 13 | 14.5 | 20 |
| Density [kg/m$^3$] | 939 | 934 | 931 |
| Comonomer | $C_6$ | $C_6$ | $C_4$ |
| Catalyst | Cr | Cr | Z-N |
| Dart impact [g] | 72 | 105 | 201 |
| Tear strength MD [N] | 0.3 | 0.4 | 1.7 |
| Yield strength TD [MPa] | 25 | | 17 |
| Secant moduls MD/TD | 500/640 | | 320/450 |
| Film thickness ($\mu$m) | 40 | 40 | 40 |

EXAMPLE 4

The material prepared according to Example 2 was blown to film employing the conditions presented in Example 1. The properties of the material and the film are shown in the third column of Table 2.

EXAMPLE 5

The material prepared according to Example 2 was blown to a film on an Alpine film line with 65 mm extruder, 160 mm die, 1.5 mm die gap and Blow-Up Ratio (BUR) 4 and Frost Line Height (FLH) equaling 8 DD. The properties of the material and the film can be seen in the fourth column of Table 2.

EXAMPLE 6

The elongational viscosity of the samples prepared in Example 1 and Example 2, as well as of the sample used in Comparative Example 1, was measured using a capillary rheometer and calculating the elongational viscosity from the pressure drop data using the Cogswell method. The method is described more in detail in Cogswell: Polymer melt rheology, a guide for industrial practice, Woodhead Publishing Ltd 1997, ISBN 1 85573 198 3. The elongational viscosity is shown as functions of shear rate and elongation rate in the attached FIG. 2 and FIG. 3 respectively. The figures show that the material according to the invention exhibits strain hardening (elongational viscosity increases with increasing elongation rate or shear rate) while the conventional materials exhibit strain thinning (elongational viscosity decreases with increasing elongation rate or shear rate).

Comparative Example 3

The material used in Comparative Example 2 was blown to a film according to what is described in Example 3. The properties of the material and the film are shown in the second column of Table 2.

TABLE 2

| MDPE type | Comparative Example 2 | Comparative Example 3 | Example 4 | Example 5 |
|---|---|---|---|---|
| $MFR_{21}$ [g/10 min] | 13 | 13 | 13 | 13 |
| Density [kg/m$^3$] | 939 | 939 | 937 | 937 |
| Comonomer | $C_6$ | $C_6$ | $C_6$ | $C_6$ |
| Catalyst | Cr | Cr | Z-N | Z-N |
| Processing * | A | B | A | B |
| Film thickness [μm] | 40 | 25 | 40 | 25 |
| Gels [n/A4] | 30–50 | 30–50 | 5 | 5 |
| Film appearance | Structured/shaded | Structured/shaded | Homogeneous | Homogeneous |
| Dart impact [g] | 72 | 180 | 185 | 250 |
| Tear MD [N] | 0.3 | 0.3 | 1.1 | 0.69 |
| Yield strength TD [MPa] | 25 | 27 | 23 | 24 |
| Secant modulus MD/TD | 500/640 | 460/670 | 460/590 | 480/630 |

* Processing conditions
A = Windmoller & Hölscher 60 mm extruder with 200 mm die/1.2 mm die gap, BUR = 3:1, FLH = 650 mm
B = Alpine 65 mm extruder with 160 mm die/1.5 mm die gap, BUR = 4:1, FLH = 1280 mm.

The main benefits of this product are improved impact and tear resistance as well as excellent film homogenity and processability, compared to conventional Cr based materials at the same stiffness levels. This type of product is particularly suited for blown film processing on HD and coextrusion lines.

What is claimed is:

1. A blown polyethylene film comprising a polyethylene composition having
   (i) a low molecular weight portion having a density of more than 960 kg/m$^3$ and an $MFR_2$ higher than 100 g/10 min; and
   (ii) a high molecular weight portion which has an $MFR_{21}$ of less than 50 g/10 min,
the polyethylene composition having a density between 929–934 kg/m$^3$ and $MFR_2$, between 12–30 g/10 min and said film exhibiting
   tensile strength, in transverse direction of at least 15 MPa;,
   1% secant modulus in machine direction of at least 300 MPa and in transverse direction of at least 400 MPa; and,
   when run to a film having a thickness between 35–45 μm in a machine operating with a low neck, a dart drop of at least 5 g/μm.

2. A blown polyethylene film comprising a polyethylene composition having
   (i) a low, molecular weight portion having a density of more than 960 kg/m$^3$ and an $MFR_2$ higher than 100 g/10 min; and
   (ii) a high molecular weight portion which has an $MFR_{21}$ of less than 50 g/10 min,
the polyethylene composition having a density between 935–939 and $MFR_{21}$ between 7–20 g/10 min and said film exhibiting
   tensile strength in transverse direction of at least 20 Mpa;
   1% secant modulus in machine direction of at least 400 MPa and in transverse direction at least 500 MPa; and,
   when run to a film having a thickness between 35–45 μm in a machine operating with a low neck, a dart drop of at least 5 g/μm; or
   when run to a film having a thickness between 20–30 μm in a machine operating with a high neck, a dart drop of at least 8 g/μm.

3. The polyethylene film according to claim 1 or claim 2, wherein the film is homogeneous.

4. The polyethylene film according to claim 1, wherein the polyethylene composition contains 2 to 10% of a comonomer selected from the group consisting of 1-butene, 1-pentene, 1-hexene, 4-methyl 1-pentene, 1-heptene, 1-octene 1-nonene, 1-decene and mixtures thereof, and the low molecular weight component contains less than 1% comonomer.

5. The polyethylene film according to claim 1, comprising 30 to 50% of the low molecular-weight portion and 70 to 50% of the high molecular weight portion.

6. A process for producing a blown polyethylene film comprising the steps of
   producing a polyethylene composition in the presence of a catalytic system of an ethylene polymerizing catalyst and cocatalyst in a multistage reaction sequence consisting of successive polymerization stages where at least one stage is carried out in a gas phase by
   subjecting ethylene, optionally hydrogen and comonomers to a first polymerization or copolymerization reaction in a first reaction zone or reactor to produce a first polymer;
   recovering the first polymer and the catalyst therein from the first reaction zone;
   feeding the first polymer into a second polymerization zone or reactor;
   feeding additional ethylene and optionally hydrogen and comonomers to the second reaction zone;
   subjecting the additional ethylene and optionally additional monomer(s) and hydrogen to a second polymerization reaction in the presence of the first polymer and the catalyst therein to produce a second polymerization product having an $MFR_{21}$ of less than 50 g/10 min.; and
   recovering the combined polymerization product from the second reaction zone, and
   blowing the thus obtained polyethylene composition into a film having a density of 929–939 kg/m$^3$.

7. A process for producing a blown polyethylene film exhibiting
   a tensile strength at yield in transverse direction at least 15 MPa,
   a density of 929 to 939 kg/m$^3$;
   a 1% secant modulus in machine direction at least 300 MPa and in transverse direction at least 400 MP a; and
   a dart drop at least 5 g/mm; comprising the steps of
   producing a polyethylene composition by
   subjecting ethylene, optionally hydrogen and comonomers to a first polymerization or copolymerization reaction in a first reaction zone or reactor to produce a polymer having a $MFR_2$ of 100 g/10 min or more;
   recovering the first polymerization product from the first reaction zone;
   feeding the first polymerization product to a second reaction zone or reactor,
   feeding additional ethylene and optionally hydrogen and comonomers to the second reaction zone,
   subjecting the additional ethylene and optionally additional monomer(s) and hydrogen to a second polymerization reaction in the presence of the first polymerization product to produce a second polymerization product having a $MFR_{21}$ of less than 50 g/10 min, and
   recovering the combined polymerization product from the second reaction zone, and blowing the thus obtained polyethylene composition into a film.

8. The process according to claim 6 or claim 7, wherein 35 to 45% by weight of the ethylene homopolymer or copolymer is produced at conditions to provide a polymer having a $MFR_2$ of 100 g/10 min or more and 65 to 55% by weight of the ethylene homopolymer or copolymer is produced at conditions to provide a polymer having a $MFR_{21}$ of less than 50 g/10 min.

9. The process according to claim 6, comprising carrying out the polymerization in a reactor cascade comprising a loop reactor and a gas phase reactor, in that order.

10. The process according to claim 8, wherein 37 to 43% by weight of the ethylene homopolymer or copolymer is produced at conditions to provide a polymer having an $MFR_2$ of 100 g/10 min or more and 63 to 57% by weight of the ethylene homopolymer or copolymer is produced at conditions to provide a polymer having an $MFR_{21}$ of less than 50 g/10 min.

11. The process according to claim 8, wherein the polymer having a $MFR_{21}$ of less than 50 g/10 min is an ethylene copolymer.

* * * * *